US011328214B2

(12) United States Patent
Mukherjea et al.

(10) Patent No.: US 11,328,214 B2
(45) Date of Patent: May 10, 2022

(54) REAL-TIME MULTI-AGENT RESPONSE BASED ON A PREFERENCE-BASED CONSENSUS

(71) Applicant: KYNDRYL, INC., New York, NY (US)

(72) Inventors: Sougata Mukherjea, New Delhi (IN); Amit A. Nanavati, New Delhi (IN); Ramasuri Narayanam, Andhra Pradesh (IN); Gyana Ranjan Parija, Gurgaon (IN)

(73) Assignee: Kyndryl, Inc., New York, NY (US)

( * ) Notice: Subject to any disclaimer, the term of this patent is extended or adjusted under 35 U.S.C. 154(b) by 1121 days.

(21) Appl. No.: 15/718,611

(22) Filed: Sep. 28, 2017

(65) Prior Publication Data

US 2019/0095804 A1 Mar. 28, 2019

(51) Int. Cl.
*G06N 5/04* (2006.01)
*G06N 20/00* (2019.01)

(52) U.S. Cl.
CPC .............. *G06N 5/043* (2013.01); *G06N 20/00* (2019.01)

(58) Field of Classification Search
CPC ................................ G06N 5/043; G06N 20/00
See application file for complete search history.

(56) References Cited

U.S. PATENT DOCUMENTS

| 8,515,884 B2 | 8/2013 | Doctor | |
|---|---|---|---|
| 9,292,832 B2 | 3/2016 | Goel | |
| 10,769,525 B2 * | 9/2020 | Redding | G06N 3/006 |
| 2005/0240568 A1 * | 10/2005 | Banerjee | G06Q 10/00 |
| 2009/0112782 A1 * | 4/2009 | Cross | G06Q 30/02 |
| | | | 706/45 |
| 2009/0198613 A1 | 8/2009 | Reeves | |
| 2010/0153142 A1 | 6/2010 | Vasudevan | |
| 2014/0279802 A1 * | 9/2014 | Harrington | G06N 5/043 |
| | | | 706/47 |
| 2015/0039548 A1 | 2/2015 | Mills et al. | |
| 2015/0066915 A1 * | 3/2015 | Golder | G06F 16/9535 |
| | | | 707/723 |
| 2015/0302308 A1 * | 10/2015 | Bartek | G06Q 10/06 |
| | | | 706/46 |

(Continued)

*Primary Examiner* — Omar F Fernandez Rivas
*Assistant Examiner* — Tri T Nguyen
(74) *Attorney, Agent, or Firm* — Schmeiser, Olsen & Watts; Ken Han

(57) ABSTRACT

A method and associated systems provide real-time response to a request received from a real-time system like a self-driving vehicle or a device that communicates interactively with its environment. The response is selected from a set of candidate feasible responses by a group of computerized agents that each sort the feasible responses in order of that agent's specific preferences, based on that agent's particular priorities or expertise. The agents then reconcile their differences through an iterative procedure. During each iteration, each agent decides whether to retain its current preferences or to adopt the preferences of another agent. This decision is made by determining which preferences are most similar to that agent's own initial preferences, and by which preferences would be most useful in helping to achieve that agent's particular goals. When the agents reach consensus, the group's most-preferred response is returned quickly enough to provide real-time, interactive response.

21 Claims, 6 Drawing Sheets

(56) References Cited

U.S. PATENT DOCUMENTS

| | | | |
|---|---|---|---|
| 2016/0092768 A1* | 3/2016 | Patil | G06F 8/61 |
| | | | 706/46 |
| 2016/0140789 A1* | 5/2016 | Wickersham, III | H04L 12/1827 |
| | | | 705/12 |
| 2016/0320956 A9 | 11/2016 | Rosenberg | |
| 2017/0024657 A1* | 1/2017 | Sahu | G06F 16/951 |
| 2017/0192423 A1* | 7/2017 | Rust | G01C 21/3492 |
| 2018/0285217 A1* | 10/2018 | Smith | G06F 21/00 |

\* cited by examiner

REAL-TIME MULTI-AGENT RESPONSE BASED ON A PREFERENCE-BASED CONSENSUS

BACKGROUND

The present invention relates in general to real-time distributed computing systems and in particular to generating a real-time response to a detected event by reconciling responses of a group of collaborative systems.

Certain applications and systems operating in a real-time computerized computing environment require real-time responses from extrinsic systems and resources. If, for example, a real-time application that continuously monitors the integrity of a mission-critical computing device detects a fault, that application may require a remote error-handling mechanism to immediately respond to a report of the fault. If the error-handling mechanism cannot be trusted to consistently respond within a minimum threshold duration of time, the application or the mission-critical component may be rendered inoperable.

Similarly, a system that must respond to a continuously varying value of a parameter, such as a current price of a market commodity, may require a near-instantaneous instruction from a remote application when that value satisfies a certain condition. For example, if the remote application's response to a report of a certain type of price fluctuation is delayed beyond a threshold response time, the system may receive a buy or sell instruction too late to complete the transaction.

A real-time response time may be especially difficult to achieve when generating a consensus response that is requires reconciling responses from a group of collaborative systems or "agents." One example of such a redundant, consensus-driven decision-making methodology is the type of command-and-control systems used in certain spacecraft, where a final navigational decision is selected by reconciling the "votes" of multiple computers running analogous, but non-identical software.

A consensus-based response may require an unpredictable response time. If the candidate decisions of the collaborating agent devices or systems are very dissimilar, for example, a greater amount of time may be required to reconcile those decisions into a single consensus decision. One solution to this problem is to overbuild the collaborative systems such that their performance is sufficient to ensure that even the longest reasonable decision-making process produces a final decision within a threshold response time.

In real-time applications, which require very low response times, such overbuilding can be costly and resource intensive. For this reason, consensus decision-making can be challenging to implement in systems that require real-time response.

SUMMARY

An embodiment of the present invention provides a real-time multi-agent system comprising a processor, a memory coupled to the processor, and a computer-readable hardware storage device coupled to the processor, the storage device containing program code configured to be run by the processor via the memory to implement a method for real-time multi-agent response based on a preference-based consensus, the d comprising:

the system receiving from a real-time application a request for a real-time response to a detected condition, where the requested response is selected by the system from a set of feasible responses, and where the real-time application is a an Internet-of-Things controller that receives real-time information from a computerized. Internet-of-Things device;

the system forwarding the request to a set of computerized agents;

the system receiving an initial preference from each agent, where each agent's initial preference comprises an initial ordering of the set of feasible responses, and where each agent's initial ordering orders the set of feasible responses as a function of that agent's relative degree of preference for each response of the set of feasible responses;

the system identifying a consensus response of the set of feasible responses by reconciling the agents' initial orderings, where the reconciling comprises reducing differences among the agents' initial orderings; and the system returning a real-time response to the real-time application that identifies the consensus response.

Another embodiment of the present invention provides a method for real-time multi-agent response based on a preference-based consensus, the method comprising:

a real-time multi-agent system receiving from a real-time application a request for a real-time response to a detected condition, where the requested response is selected by the system from a set of feasible responses, and where the real-time application is a an Internet-of-Things controller that receives real-time information from a computerized Internet-of-Things device;

the system forwarding the request to a set of computerized agents;

the system further receiving an initial preference from each agent, where each agent's initial preference comprises an initial ordering of the set of feasible responses, and where each agent's initial ordering orders the set of feasible responses as a function of that agent's relative degree of preference for each response of the set of feasible responses;

the system identifying a consensus response of the set of feasible responses by reconciling the agents' initial orderings, where the reconciling comprises reducing differences among the agents' initial orderings; and the system returning a real-time response to the real-time application that identifies the consensus response.

Another embodiment of the present invention provides a computer program product, comprising a computer-readable hardware storage device having a computer-readable program code stored therein, the program code configured to be executed by a real-time multi-agent system comprising a processor, a memory coupled to the processor, and a computer-readable hardware storage device coupled to the processor, the storage device containing program code configured to be run by the processor via the memory to implement a method for real-time multi-agent response based on a preference-based consensus, the method comprising:

the real-time multi-agent system receiving from a real-time application a request for a real-time response to a detected condition, where the requested response is selected by the system from a set of feasible responses, and where the real-time application is a an Internet-of-Things controller that receives real-time information from a computerized Internet-of-Things device;

the system forwarding the request to a set of computerized agents;

the system further receiving an initial preference from each agent, where each agent's initial preference comprises an initial ordering of the set of feasible responses, and where each agent's initial ordering orders the set of feasible responses as a function of that agent's relative degree of preference for each response of the set of feasible responses;

the system identifying a consensus response of the set of feasible responses by reconciling the agents' initial orderings, where the reconciling comprises reducing differences among the agents' initial orderings; and the system returning a real-time response to the real-time application that identifies the consensus response.

Another embodiment of the present invention provides a real-time multi-agent system comprising a processor, a memory coupled to the processor, and a computer-readable hardware storage device coupled to the processor, the storage device containing program code configured to be run by the processor via the memory to implement a method for real-time multi-agent response based on a preference-based consensus, the method comprising:

the real-time multi-agent system receiving from a real-time application a request for a real-time response to a detected condition, where the requested response is selected by the system from a set of feasible responses, where the real-time application comprises a vehicle controller that receives real-time information from a self-driving vehicle, and where the self-driving vehicle requires from the system a real-time response to the received real-time information;

the system forwarding the request to a set of computerized agents;

the system receiving an initial preference from each agent, where each agent's initial preference comprises an initial ordering of the set of feasible responses, and where each agent's initial ordering orders the set of feasible responses as a function of that agent's relative degree of preference for each response of the set of feasible responses;

the system identifying a consensus response of the set of feasible responses by reconciling the agents' initial orderings, where the reconciling comprises reducing differences among the agents' initial orderings; and the system returning a real-time response to the real-time application that identifies the consensus response.

Another embodiment of the present invention provides a method for real-time multi-agent response based on a preference-based consensus, the method comprising:

a real-time multi-agent system receiving from a real-time application a request for a real-time response to a detected condition, where the requested response is selected by the system from a set of feasible responses, where the real-time application comprises a vehicle controller that receives real-time information from a self-driving vehicle, and where the self-driving vehicle requires from the system a real-time response to the received real-time information;

the system forwarding the request to a set of computerized agents;

the system further receiving an initial preference from each agent, where each agent's initial preference comprises an initial ordering of the set of feasible responses, and where each agent's initial ordering orders the set of feasible responses as a function of that agent's relative degree of preference for each response of the set of feasible responses;

the system identifying a consensus response of the set of feasible responses by reconciling the agents' initial orderings, where the reconciling comprises reducing differences among the agents' initial orderings; and the system returning a real-time response to the real-time application that identifies the consensus response.

Another embodiment of the present invention provides a computer program product, comprising a computer-readable hardware storage device having a computer-readable program code stored therein, the program code configured to be executed by a real-time multi-agent system comprising a processor, a memory coupled to the processor, and a computer-readable hardware storage device coupled to the processor, the storage device containing program code configured to be run by the processor via the memory to implement a method for real-time multi-agent response based on a preference-based consensus, the method comprising:

the real-time multi-agent system receiving from a real-time application a request for a real-time response to a detected condition, where the requested response is selected by the system from a set of feasible responses, where the real-time application comprises a vehicle controller that receives real-time information from a self-driving vehicle, and where the self-driving vehicle requires from the system a real-time response to the received real-time information;

the system forwarding the request to a set of computerized agents;

the system further receiving an initial preference from each agent, where each agent's initial preference comprises an initial ordering of the set of feasible responses, and where each agent's initial ordering orders the set of feasible responses as a function of that agent's relative degree of preference for each response of the set of feasible responses;

the system identifying a consensus response of the set of feasible responses by reconciling the agents' initial orderings, where the reconciling comprises reducing differences among the agents' initial orderings; and the system returning a real-time response to the real-time application that identifies the consensus response.

DETAILED DESCRIPTION

Figure 1:
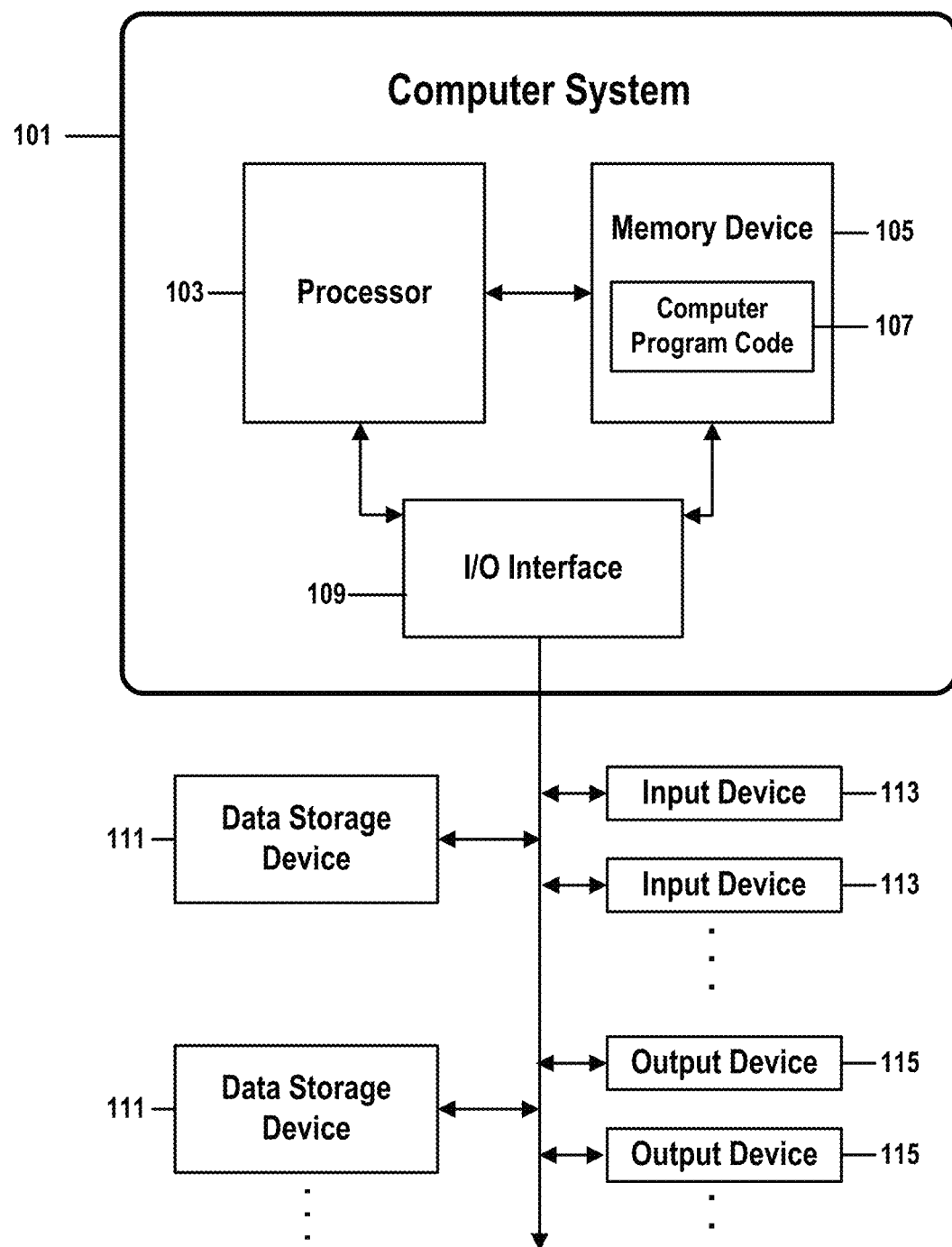
FIG. 1 shows the structure of a computer system and computer program code that may be used to implement a method for real-time multi-agent response based on a preference-based consensus in accordance with embodiments of the present invention.

Collaborative decision-making systems may be used in applications in which a single decision-making "agent" may not determine a best response to a set of conditions with sufficient certainty. A predictive system, for example, may be able to predict probabilities that various events or conditions will occur in the future, but may not be able to determine which events or conditions are likely to occur within a desired level of confidence. If, however, multiple systems (or "agents) each make a best guess at such an event or condition, those guesses can in some cases be reconciled into a single higher-confidence consensus decision.

In other cases, a mission-critical decision may be important enough to justify basing that decision on a consensus of redundant decision-making agents. This consensus may be afforded even greater confidence if those agents use different software or hardware to make their decisions, thus reducing the chance of a systemic bias. A collaborative flight-navigation system, for example, may control an aircraft by allowing a group of computers to "vote" on each navigational command, where each computer is based on a different hardware platform or runs a different operating system.

In yet another example, a system may be implemented as a collaborative set of resources if that system is expected to encounter unknown conditions that cannot be hard-coded into software. For example, designers of a "rover" vehicle designed to explore the surface of a another planet play have no idea of the conditions that the rover may encounter. Therefore, the rover may be controlled by multiple artificially intelligent machine-learning applications that each learn to handle a distinct set of challenges in different ways. When the rover encounters an unexpected problem, its response may then be determined by a consensus decision of the applications.

Many other examples of multi-agent, collaborative decision-making applications are known in the art.

Real-time systems and applications may comprise interactions with extrinsic components that require response times low enough to qualify the interactions as being "interactive." Although, as is known in the art, a threshold for "real-time" or "interactive" response may vary with application, real-time applications generally require very small response times. In the field of computing, a real-time system may be one capable of receiving data from an environment at a particular time, processing that data, and the returning the results of that processing quickly enough to affect the environment state that existed at the particular time. An analogous definition merely describes a real-time system as one that is capable of responding quickly enough to an occurrence of a condition that a substantial portion of that condition still exists when the response occurs. Yet another definition states that real-time responses are responses returned quickly enough to, in general, create an illusion of conversational human activity. The present invention is flexible enough to accommodate these and any other generally accepted definitions of "real-time" response times.

A real-time commodities-trading system, for example, must be able to respond to a change in commodity prices quickly enough to place a buy or sell order capable of taking advantage of that change. In some implementations, this requirement may require response times that are no greater than a few seconds, but in other implementation the required response time may be allowed to consume tens of seconds, or limited to a certain fraction of a second, depending on implementation details. Embodiments of the present invention are flexible enough to accommodate any such response-time requirements desired by an implementer.

In another example, a real-time Internet-of-Things (IoT) device may continuously monitor a state of a remote system. This device might, for example, be a thermostat that monitors the ambient temperature of an apartment, a carbon-monoxide detector that monitors CO levels, a voice-enabled controller that listens for a certain voice command, or an IoT coffeemaker that monitors a WiFi network for a command to begin brewing a pot of coffee.

Such real-time IoT devices may, upon detecting a certain condition, request an instruction or other input from a remote resource. An IoT smoke-detecting fire alarm, for example, might report a detection of smoke to a remote decision-making control station that, in turn, responds to the alarm with commands for the device to contact a certain fire department, to trigger an IoT sprinkler system, or to notify the alarm's owner.

In yet another case, a distributed anti-malware tool may determine whether suspicious software or a subject system's suspicious behavior is likely to indicate a malware infection. Such a tool may comprise multiple analytic-engine agents that decide in real-time whether suspected activity or software objects should be interpreted as indicating the presence of a known category of malware. In related embodiments, an anti-malware application may be implemented as a multitasking or multiprocessing program distributed across multiple cores or processors of a single computer system or nodes of a local-area network, where each core, processor, or node is an agent capable of making an independent determination of whether an infection exists on another core, processor, or node.

By basing such decisions on multiple agents, operating on multiple, distinct, platforms, the anti-malware tool may reduce the likelihood that a decision is made by a single infected analytical engine.

Such specialized anti-malware tools may be required to provide real-time response because many malware infections are capable of rapidly spreading to an enormous number of systems. In such cases, even the tiniest delay may result in a failure to contain an infection. This consideration is especially important in anti-malware tools adapted to identify and contain zero-day exploits, which are caused by previously unknown malware. Not only must such systems be able to respond in a very brief period of time, but they must also comprise a means of accurately guessing that previously unknown software signatures or system behavior is likely to be the result of some new type of infection. As described above, one way to increase the likelihood that such a guess is correct is by basing it on a consensus decision of multiple, distinct agents.

Self-driving vehicles are another class of real-time application that can benefit from consensus decision-making. Such vehicles must be able to react in real time to unexpected traffic and road conditions, driver and passengers problems, and issues related to weather and other environmental factors. One way in order to increase the likelihood that a self-driving vehicle responds to an unexpected event in an appropriate manner is to base that response on a consensus decision of a group of embedded processors or sensors, remote services, or other types of agents capable of responding with a consensus response in real time to the vehicle in response to receiving the vehicle's report the unexpected event.

Yet another example of a system that must react in real time

As with the commodities-trading system, other types of interactive software and real-time devices must receive a response quickly enough to be able to have an effect upon the condition that triggered the request for the response. A device equipped with voice-activated user interface, for example, must react to a voice command quickly enough to create an illusion of interactive conversation, just as a smoke-alarm or CO detector must take action quickly enough after detecting a dangerous condition to be able to mitigate the potential consequences of that condition, and a self-driving vehicle must receive a steering command quickly enough to avoid an obstacle, and a trading system must be able to place a buy or sell order quickly enough to lock in the price that triggered the buy/sell decision. Therefore, although the precise definition of a time threshold that defines "real-time" or "interactive" response may vary from implementation to implementation, an implementer skilled in the field and familiar with the requirements of a particular implementation is capable of determining timing constraints that enable real-time or interactive response within the context of that implementation and field.

In all these examples, some embodiments of the present invention may require agents to ultimately reach a common consensus state in which all agents agree. But other embodiments may relax this requirement such that a consensus is reached when the agents' reach a certain predefined threshold of similarity. For example, an embodiment may deem a consensus to have been reached when a certain subset, percent, or absolute number of agents agree. Another embodiment might deem a consensus to exist when some or all agents reach partial agreement. Here, partial agreement may be identified in any way desired by an implementer. In one example, two agents may be deemed to be in partial agreement if the two agents each identify a set of most-highly preferred conclusions, and those two sets share at least a minimum threshold number of common conclusions. In other cases, a consensus may require stricter criteria than mere agreement on a single preferred decision. For example, if two agents each identify a set of five most-highly preferred options, a consensus may be deemed to exist only if both sets contain the same five options, or if both sets rank the same five options in the same order.

Embodiments of the present invention comprise systems and methods capable of providing real-time response when system commands or instructions, or other types of decisions, are determined by consensus agreement among multiple hardware systems, applications, or other types of technology-based "agents." Certain embodiments comprise predictive consensus decision-making mechanism that try to guess which future events are most likely to occur in response to any future condition that the system may detect, and then perform in real-time any functions deemed by such a consensus decision to be most likely to produce a desirable result.

These embodiments provide a technical solution to a problem rooted in technology. Although groups of humans have long participated in group decision-making, the need to determine a group decision in real time, where that decision is made by multiple computerized agents in order to control the real-time operation of another system, did not exist before the advent of real-time control and analytical systems that must respond to a detected condition in real time, and that cannot rely upon a decision of a single agent.

Without the ability to provide real-time response, embodiments that comprise self-driving cars, commodities-trading and securities-trading systems, financial-management systems, distributed anti-malware utilities, real-time Internet-of-Things controllers, certain classes of user interfaces, and many other types of real-time and interactive systems and applications would become inoperable. Similarly, without a means of identifying a consensus decision in real time, where that decision is based on a negotiation of multiple, distinct, computerized agents, these applications would become much less reliable, and possibly be rendered useless.

There is thus a need for a technological way to control the operation of computerized technology in real time, where that control must be based on a consensus decision of multiple decision-making agents. Embodiments of the present invention provide systems and methods for real-time consensus decision-making by multiple agents, where it is possible to provide response times sufficiently low to enable real-time control of such computerized technology.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device, Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

FIG. 1 shows a structure of a computer system and computer program code that may be used to implement method for real-time multi-agent response based on a preference-based consensus in accordance with embodiments of the present invention. FIG. 1 refers to objects 101-115.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for real-time multi-agent response based on a preference-based consensus in accordance with embodiments of the present invention, and may implement other embodiments described in this specification, including the methods illustrated in FIGS. 1-6. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard chive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for real-time multi-agent response based on a preference-based consensus.

Any of the components of the present invention could be created, integrated, hosted, maintained, deployed, managed, serviced, supported, etc. by a service provider who offers to facilitate a method for real-time multi-agent response based on a preference-based consensus. Thus the present invention discloses a process for deploying or integrating computing infrastructure, comprising integrating computer-readable code into the computer system 101, wherein the code in combination with the computer system 101 is capable of performing a method for real-time multi-agent response based on a preference-based consensus.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for a method for real-time multi-agent response based on a preference-based consensus may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for a method for real-time multi-agent response based on a preference-based consensus is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
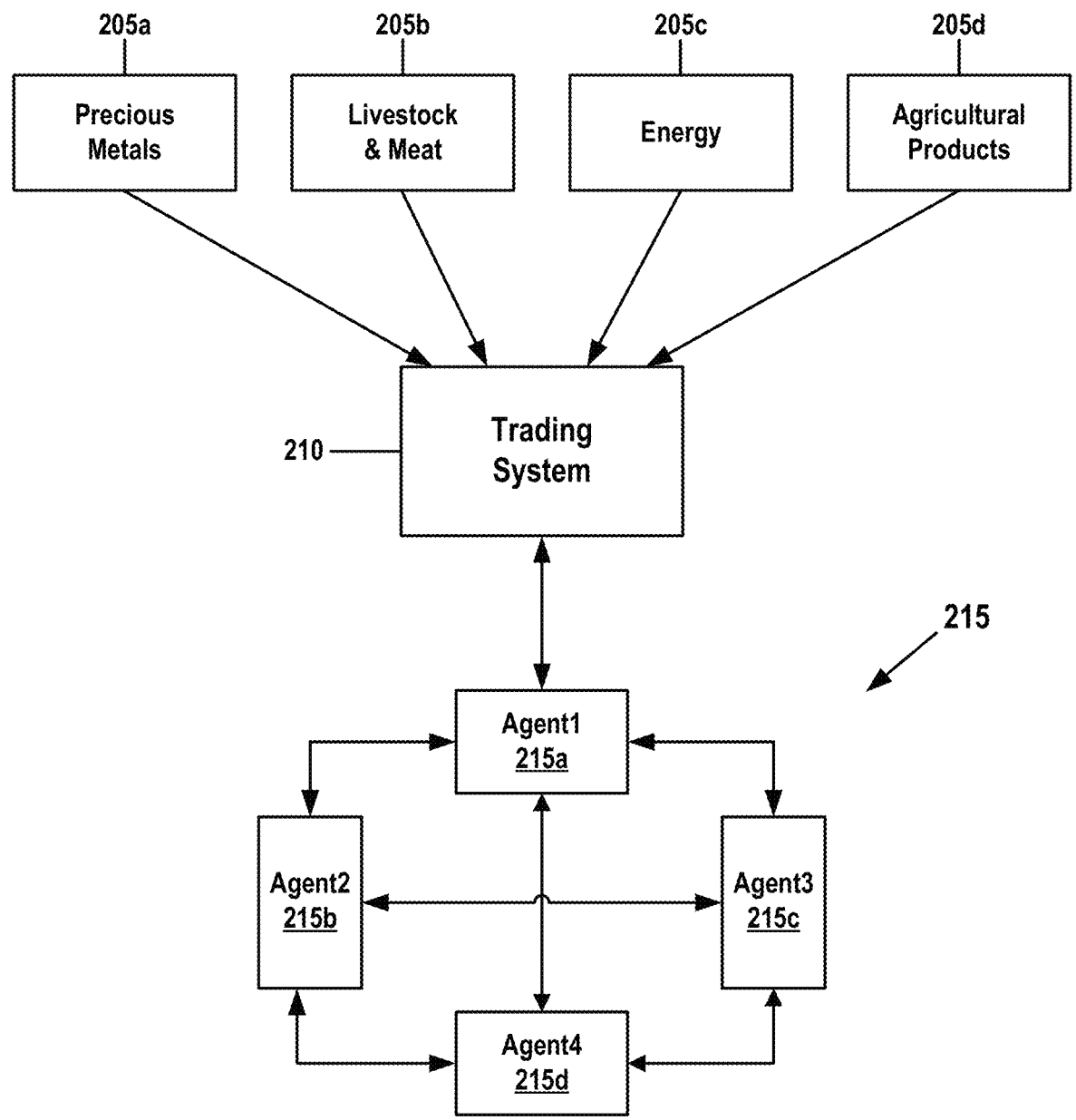
FIG. 2 shows an architecture of a commodities-trading system that provides real-time multi-agent response based on a preference-based consensus in accordance with embodiments of the present invention.

FIG. 2 shows an architecture of a commodities-trading system 210 that provides real-time multi-agent response based on a preference-based consensus in accordance with embodiments of the present invention. FIG. 2 comprises items 205a-215d.

As described above, the commodities-trading system 210 performs real-time commodity trades based on decisions made by a group 215 of decision-making agents 215a-215d. These agents may be computerized systems, software applications, or other technology-based entities capable of determining how to respond to a particular condition of a commodities market. Despite the example of FIG. 2, embodiments may comprise any number of groups of agents and any number of agents in each group. In some applications, an embodiment that comprises a total of at least four agents may provide a most accurate result.

In accordance with methods and examples described above and illustrated in FIG. 4, the system 210 continuously monitors prices, trends, or other characteristics of various commodities markets. These markets may comprise precious metal markets 205a (including gold, silver, platinum and copper), livestock and meat markets 205b (such as lean hogs, pork bellies, live cattle and feeder cattle), energy markets 205c (such as crude oil, heating oil, natural gas and gasoline), and agricultural-product markets 205d (including corn, soybeans, wheat, rice, cocoa, coffee, cotton and sugar).

When system 210 detects an occurrence of a particular condition, system 210 responds in real time by reporting the condition, or a state related to the condition, to the group of agents 215. Such a condition might, for example, be a price of a particular commodity, group of commodities, or class of commodities exceeding or falling below a predefined threshold. Another example of such a condition might be a pricing trend of a commodity, a certain level of overvaluation or undervaluation of a commodity, a certain level of price volatility of a commodity, or a projected future price of a commodity.

System 210, in reporting the condition may request from the group of agents 215 a certain response. This requested response might be, for example, a confirmation of a buy order or a sell order, a projection of a future level of volatility, or an inference of a pricing trend. The response may be of a type that must be returned in real time, where "real time" is defined as a duration of time short enough to allow system 210 to respond to the detected condition while the condition is likely to still exist.

For example, if system 210 identities that the aggregate price of the precious-metals commodity market 205a has fallen below a threshold value, the system 210 may respond by requesting from the agent group 215 authorization of a certain purchase of gold futures. The agent group 215 is then expected to return either an authorization to purchase or an order to either perform a different purchase, a sale, or no activity at all, and to return this response quickly enough to allow system 210 to place its order while the aggregate price of market 205a remains below the threshold value. Such a response time, in this application, would be considered by those skilled in the art of commodities trading to be a "real-time" response.

Some embodiments may comprise a group of decision-making systems or applications as agents 215a-215d, rather than a single decision-making system or application, in order to arrive at a decision that better accounts for different perspectives. This may be especially important in cases where a decision is made in a multidisciplinary field or must be effect a compromise among competing priorities.

For example, a system 210 that must decide instantly how to respond to a sharp increase in the price of fossil-energy futures may be required to base its decision on four sets of priorities: a prediction of the effect of breaking news on short-term futures prices, an analysis of longer-term trends on fossil-energy prices, a consideration of the social effect of carbon emissions produced by most current fossil-fuel technology, and a set of financial-management rules that continuously attempt to rebalance client portfolios. Each of agents 215a-215d may base its preferred recommendation on constantly updated, current expert knowledge in one of these four areas and the final response returned to system 210 may be a consensus decision made by reconciling decisions made from these four perspectives.

Figure 4:
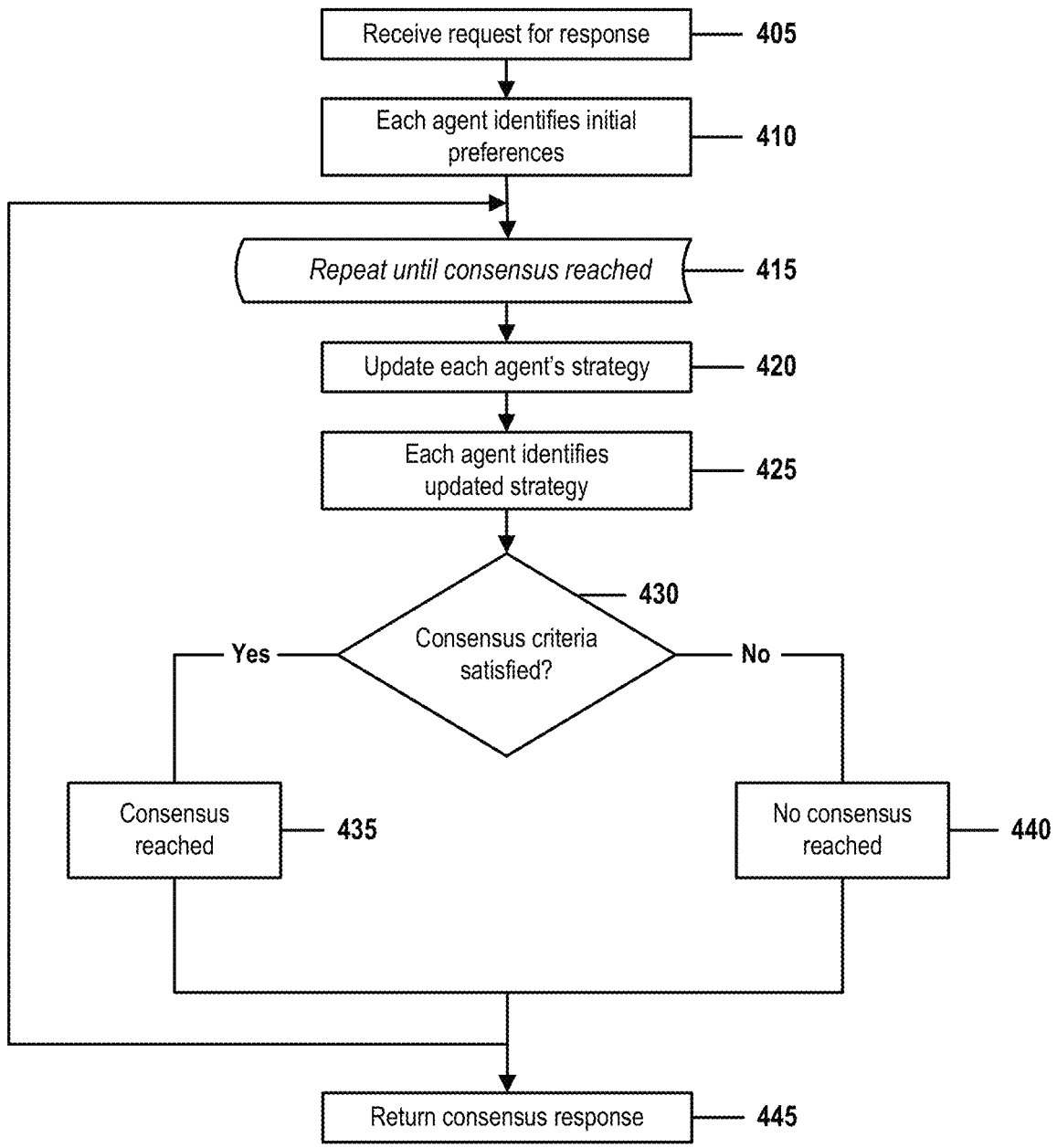
FIG. 4 is a flow chart that illustrates steps of a method for real-time multi-agent response based on a preference-based consensus in accordance with embodiments of the present invention.

The group 215 determines its response by means of methods described in FIG. 4. These methods comprise steps in which agents 215a-215d iteratively negotiate the content of the response returned to system 210 until a consensus decision is reached.

Figure 3:
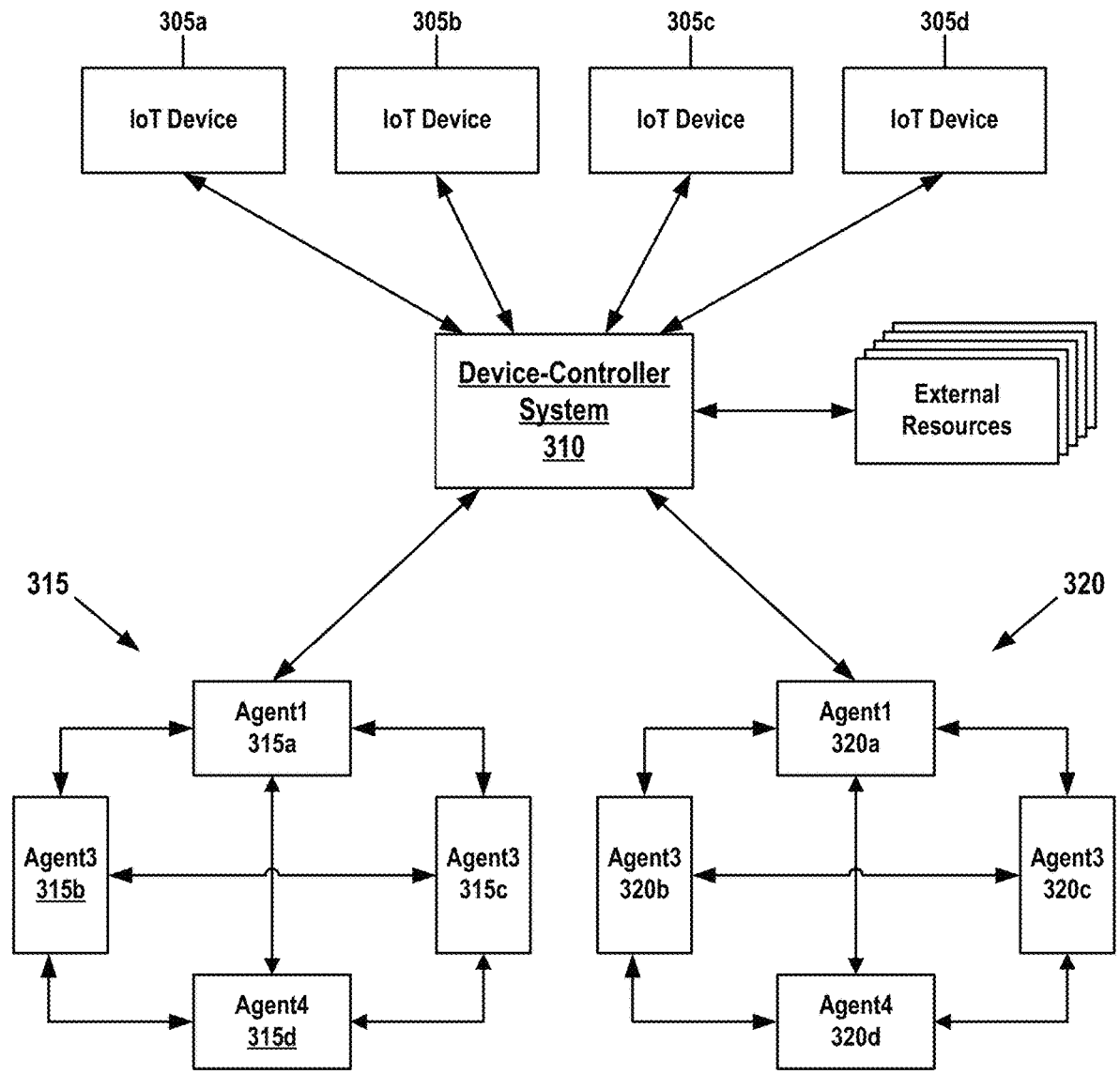
FIG. 3 shows an architecture of an Internet-of-Things application that provides real-time multi-agent response based on a preference-based consensus in accordance with embodiments of the present invention.

FIG. 3 shows an architecture of an Internet-of-Things application that provides real-time multi-agent response based on a preference-based consensus in accordance with embodiments of the present invention. FIG. 3 comprises items 305a-320d.

As described above, the IoT device-controller system 310 provides real-time control of IoT devices 305a-305d, based on decisions made by two groups 315 and 320 of decision-making agents 315a-315d and 320a-320d, respectively. These agents may be computerized systems, software applications, or other technology-based entities capable of determining how to respond to a particular condition of a commodities market. Embodiments of the present invention may comprise any number of such groups, each of which may comprise any number of agents.

In some embodiments, each group may have further constraints on the number of agents in each group, such as a minimum number of two agents per group, a maximum number of agents per group, or a minimum or maximum total number of agents among all groups. In some embodiments, different agents of the same group may represent different points of view or may select a preferred course of action based on different criteria or priorities. Similarly, in certain embodiments, different groups may be configured to represent different points of view or to arrive at a group-consensus decision based on different sets of criteria or priorities.

For example, in an embodiment that comprises a self-driving automobile, a first agent may be programmed to give greatest weight to cost factors when selecting a preferred course of action, while a second agent may be programmed to give greater weight to customer-safety issues. In this case, if the automobile senses an obstacle in the road, the first agent may prefer to order the car to swerve, while the second agent may prefer to brake and deploy air bags. Those preferences would be determined by a judgement that deploying air bags would give the driver a slightly greater chance of avoiding injury, but would result in thousands of dollars of expense in order to replace the deployed air bags.

In accordance with methods and examples described above and illustrated in FIG. 4, the system 310 continuously monitors the devices 305a-305d. These devices, as is known in the art, may comprise computer-controlled thermostats, lighting, smoke detectors, carbon monoxide detectors, door locks, fire alarms, kitchen appliances, voice-controlled entertainment-center controllers, and many other types of devices. These devices 305a-305d continuously monitor environmental conditions and may be instructed by system 310 to respond in real-time to certain environmental conditions.

When system 310 detects an occurrence of a particular predefined condition, system 310 responds in real time by reporting the condition, or a state related to the condition, to the one or both of agent groups 315 and 320. Such a condition might, for example, be an certain level of environmental carbon monoxide, a certain level of environmental smoke or heat that suggests the existence of a fire, a particular set of spoken words, or a detection of movement by a motion-detecting burglary-warning device.

System 310, in reporting the condition may request from the groups 315 or 320 a certain response. This requested response might be, for example, an instruction to contact a certain fire department in response to a report of smoke, an instruction to begin recording a cable program in response to a report that a certain natural-language instruction has been spoken, or a direction to call a smartphone of the IoT device's owner, after boosting the smartphone's ringer to its maximum volume level, in response to a detection of a high level of CO.

Such responses are expected by system 310 to arrive in real time. In this application, as would be considered by those skilled in the art of IoT device design, a "real-time" response might be interpreted to be a response that is returned quickly enough to allow system 310 to address the reported condition while that condition still exists, or that arrives quickly enough to address the reported condition in a reasonable manner.

For example, if system 310 reports a high CO level to the groups 315 and 320, the system 310 might be programmed to expect a response from the groups 315 and 320 within two seconds, in order to minimize the possibility that the IoT device's owner may be in grave danger. Similarly, if system 310 reports a detection that a certain natural-language instruction has been spoken to a microphone-equipped IoT device 305a-305d, then a real-time response from groups 315 and 320 (comprising an instruction based on inferences derived by groups 315 and 320 from the natural-language speech) might be a response that arrives quickly enough to allow the microphone-equipped device 305a-305d to simulate the pacing of a human conversation. In some embodiments, this threshold response time might, for example, be set to 1.5 seconds, based on expert knowledge of a person skilled in the field, or on industry standards or conventions.

FIG. 4 is a flow chart that illustrates steps of a method for real-time multi-agent response based on a preference-based consensus in accordance with embodiments of the present invention. FIG. 4 contains steps 405-445, which may be performed by embodiments that incorporate architectures similar to those illustrated in FIGS. 2 and 3.

The method of FIG. 4 comprises a group A of n agents, where $A=\{A(1), A(2), \ldots, A(n)\}$ and a set S of m feasible solutions to a problem, where $S=\{S(1), S(2), \ldots, S(m)\}$. Each agent, upon receiving a request to identify a best solution to the problem, initially ranks the feasible solutions in a particular order as a function of the agent's preferences, ranging between the agent's most-preferred solution and the agent's least-preferred solution. The goal of the method of FIG. 4 is for the agents to reach a consensus such that the agents agree on a best way to prioritize and order the set of feasible solutions S.

In step 405, a real-time system 210 or 310 reports a condition or communicates other information to the group of agents A, where the report or condition requires agents to return a response in real time. Examples of such systems, conditions, and responses are described in detail above and in FIGS. 2 and 3.

In one example, an Internet-of-Things device controller system 310 may report to agents A that an IoT burglar alarm 305a has detected an unauthorized entry into a garage of a monitored house and requests an immediate response from the agents. This response may be selected from a set of candidate responses S that may comprise instructing the alarm to: notify the owner, activate an onsite alarm, turn on onsite floodlights, place an automated call to a local police department, transmit a code to a contracted security firm, begin recording a video of the intrusion, or perform some other action.

In step 410, each agent of set A, in reaction to receiving the communication of step 405, ranks the candidate solutions S in order of preference. Each agent may order the solutions differently, depending on each agent's particular priorities. One agent, for example, may select a solution based on priorities identified by the local police department, while another agent may reflect the homeowner's personal preferences, and a third may be programmed to act more conservatively, first gathering more information (such as a video recording) and forwarding that information to the homeowner before taking her steps.

Step 415 initiates an iterative procedure of steps 415-440 in which the agents A attempt to select a best response to return to the controller system 310. Each iteration of this iterative procedure involves an automated procedure that attempts to reduce dissimilarity among the agents' preferred orderings of the candidate solutions S. The iterative procedure continues in this manner until a consensus decision is reached in which all agents agree to return a particular response to the requesting controller 310.

Figure 5:
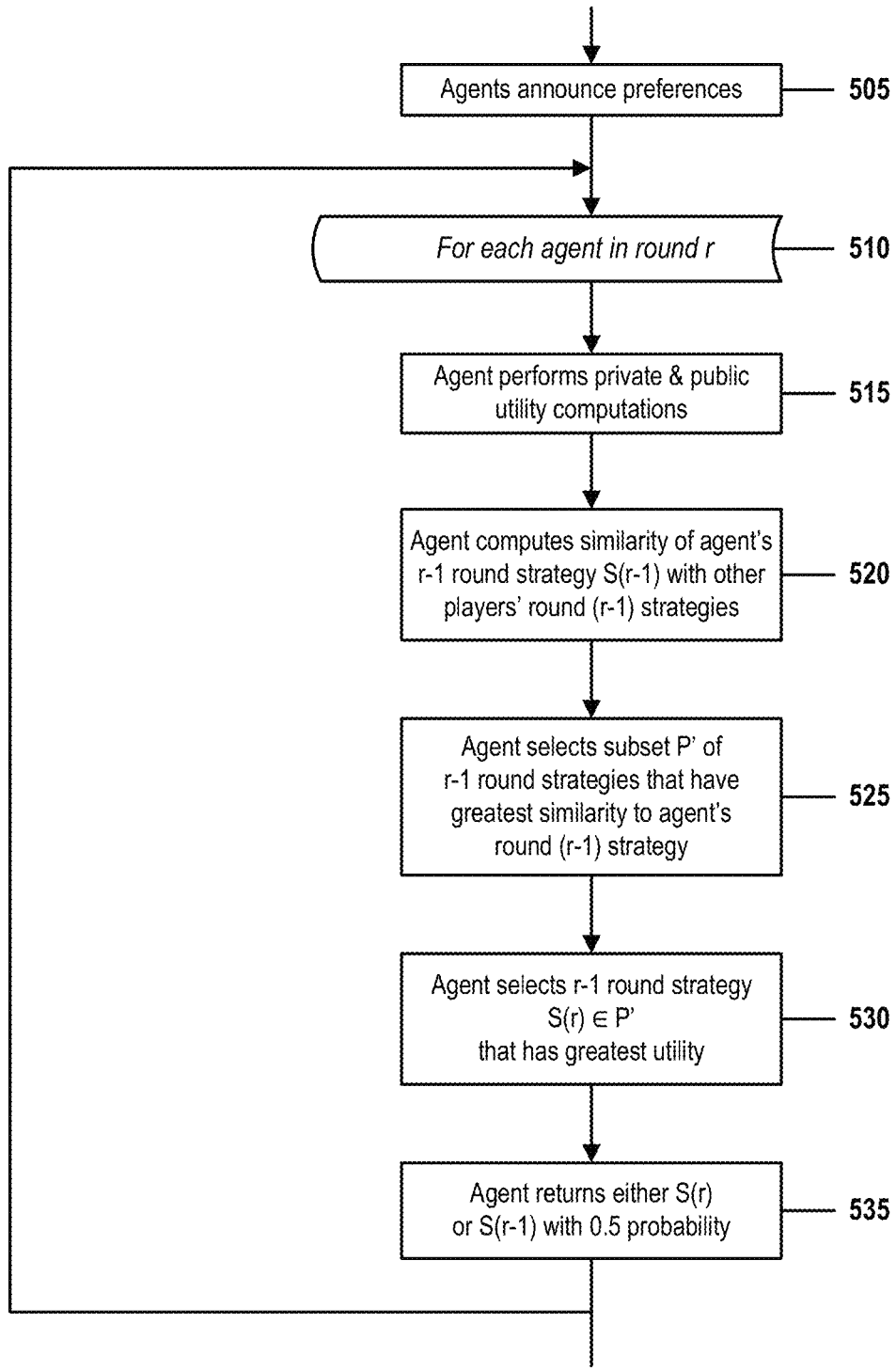
FIG. 5 is a flow chart that illustrates a first computational strategy-update procedure for reducing dissimilarities among agent strategies in accordance with embodiments of the present invention.
Figure 6:
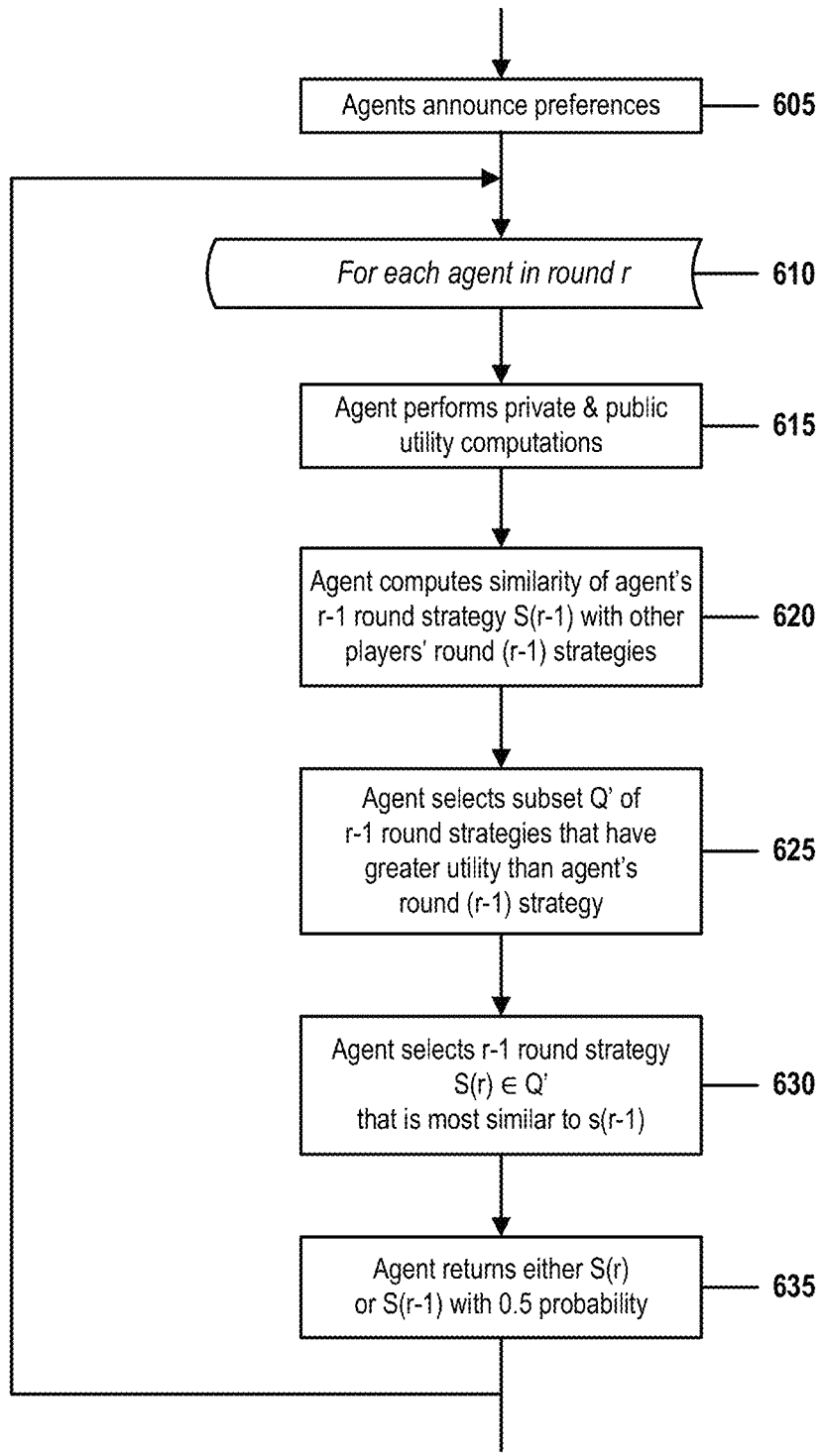
FIG. 6 is a flow chart that illustrates a second computational strategy-update procedure for reducing dissimilarities among agent strategies in accordance with embodiments of the present invention

In step 420, a computational procedure (or "strategy") is performed with the intent of reducing dissimilarities among the agents' preferred order of solutions. The goal of this procedure is to adjust the agents' orders of solutions such that those orders become more similar. It is possible for this strategy to be performed by any computational method known to reduce dissimilarity among distinct datasets, but FIGS. 5 and 6 illustrate novel examples of such strategies that are in accordance with embodiments of the present invention.

In step 425, each agent identifies its updated preferred order, as adjusted by the strategy or computational procedure of step 420.

In step 430, it is determined whether a consensus decision has been reached by steps 420 and 425. In some embodiments, a consensus occurs only when all agents completely agree on an order in which the solutions of S should be ranked. Alternative embodiments, however, may define stricter or looser requirements for a consensus.

For example, some embodiments may deem that a consensus has been reached when the agents' solution orders reach a certain predefined threshold of similarity, such as when a certain subset, percent, or absolute number of agents agree on the same order of solutions. Other embodiments might deem a consensus to exist when some or all agents reach partial agreement. In such cases, partial agreement may be identified by criteria desired by an implementer. In one example, two agents may be deemed to be in partial agreement if the two agents each rank a subset of solutions in the same relative order.

In other cases, a consensus may require mere agreement on a single most-highly preferred decision, or may require complete agreement on a certain number of the most highly preferred decisions. For example, if agents each attempt to order ten candidate solutions S, a consensus may be deemed to exist if the agents all rank a same five-solution subset of S most highly, rank the same five-solution subset in the same relative order, or both.

In yet other embodiments, a consensus may be deemed to occur when successive iterations of the procedure of steps 415-440 do not result in a significant change in any agent's ordering, or result in changes that do not exceed a threshold level, where that level may identify a total number of changes in all agents' rankings, an average percent change of each agents' ranking, or another type of criteria deemed relevant by an implementer.

Regardless of how an implementer decides to determine whether a consensus has been reached, the method of FIG. 4 continues with 435 if it is determined that a consensus has been reached, or continues with step 440 if it is determined that no consensus has been reached. In this latter case, the method of FIG. 4 returns to step 415 and the iterative procedure of steps 415-440 begins its next iteration.

If a does consensus exist, the iterative procedure of steps 415-440 ends with step 440 and the system returns the final consensus decision as a response to the requesting system in step 445.

FIG. 5 is a flow chart that illustrates a first computational strategy-update procedure for reducing dissimilarities among agent strategies in accordance with embodiments of the present invention. This update procedure is a novel example of a procedure for implementing step 420 of FIG. 4. FIG. 5 comprises steps 505-535.

The method of FIG. 5 updates the decision-making strategies of each agent in a group of agents that are negotiating a consensus response to the request received in step 405 of FIG. 4. The description of the method of FIG. 5 arbitrarily assumes, for pedagogical purposes, the real-time multi-agent architecture shown in FIG. 2. However, analogous methods may be used in embodiments based on an architecture similar to that of FIG. 3 or on other architectures or topologies like those described above and in FIGS. 1-3.

In this example, a group 215 of agents 215a-215d each identify a strategy that ranks possible responses to the request of step 405 in order of preference. Given a set R of m possible responses R={(R(1), R(2), . . . , R(m)}, then each agent's strategy is a sequence that orders some or all them responses in R in that agent's forward or reverse order of preference. For example, if the set R contains three responses {R(1), R(2), R(3)}, (that is, if m=3), then agent 215a may define a strategy that orders the solutions in the sequence S(215a)=(R(3), R(1), R(2)), indicating that response R(3) is agent 215a's most preferred response, response R(1) is agent 215a's second-most preferred response, and response R(3) is agent 215a's least-preferred response. In some embodiments, the order of responses in this agent's strategy may be reversed, such that S(215a) indicates that response R(3) is agent 215a's least-preferred response, response R(1) is agent 215a's second-most preferred response, and response R(3) is agent 215a's most-preferred response. In a similar manner, each agent is associated with a strategy that may be expressed as an order of responses in which the responses monotonically increase or decrease between a most-preferred response and a least-preferred response.

Each performance of step 420 (which performs the method of FIG. 5) occurs once during a round (r) of the iterative procedure of FIG. 4 steps 415-440. Each performance of step 420 and the method of FIG. 5 adjusts the previous round (r−1) strategies of each agent of group 215 such that the adjusted round (r) strategies more closely approach a common consensus decision. FIG. 4 repeats step 420 and the method of FIG. 5 until the strategies of the agents 215a-215d of group 215 converge to a consensus decision.

At the outset of the method of FIG. 5 each agent 215a-215d of agent group 215 is associated with that agent's previously identified round (r−1) strategy, which consists of a sequence of some or all candidate responses R ordered as a function of that agent's order of preference.

The first time that FIG. 4 step 420 calls the method of FIG. 5, each agent begins performing the method of FIG. 5 by announcing an initial-preferences strategy selected by that agent in FIG. 4 step 410. Each agent's initial strategy is based on that agent's true preferences and priorities specific to that agent. In subsequent performances of FIG. 4 step 420, each agent will begin a current round (r) of the method of FIG. 5 with a strategy selected by that agent in the previous round (r−1) performance of the method of FIG. 5.

If, at any time, the agents' strategies reach a consensus, the method of FIG. 4 ends. A consensus may occur when the agents agree on the same strategy—that is, when the agents all order the set of feasible responses in the same way. The method of FIG. 4 may also end prematurely, without ever calling a method of FIG. 5 or of FIG. 6, if a consensus exists among the agents' initial-preference strategies selected in step 410.

In some embodiments, a consensus may occur if a subset of agents select the same strategy, or if some or all agents select strategies that are sufficiently similar to satisfy a threshold condition. Such a condition might, for example, require that different agents' strategies order a certain number of responses in the same relative order or that a those strategies associate a same or similar subset of the set of feasible strategies with a higher-position priority.

In step 505, each agent of group 215 announces its previous round (r−1) strategy to other agents of group 215. If the agents have previously shared their r−1 strategies in a previous performance of the method of FIG. 5 or in a step of the method of FIG. 4, this step may be omitted.

Step 510 begins an iterative procedure of steps 510-535. Each iteration of this procedure identifies steps to be taken by one particular agent 215a-215d of group 215 to update that agent's "r−1" strategy, selected during the most recent round (r−1) (and the most recent performance of the method of FIG. 5), to a new round (r) strategy. As described above, this updating is performed by adjusting the agent's most recent round (r−1) preferential order of responses to an adjusted "round (r)" preferential order of responses.

At the conclusion of the final iteration of the iterative procedure of steps 510-535, each agent of group 215 will have updated its previous-round agent-specific strategy to a "round (r)" strategy and the strategy-update procedure of round (r) will have completed. Control will then return to step 425 of the "round (r)" iteration of the iterative procedure of FIG. 4 steps 415-440, which will determine whether the updated strategies now constitute a consensus.

In step 515, an "$i^{th}$" agent of group 215 begins round (r) of a procedure to update agent i's previous round (r−1) strategy to a new round (r) strategy. In this step, agent i performs a set of utility computations that derive a "utility" value of each combination of agent i's strategy with the strategies of another agent of group 215.

This utility may be derived by means of Utility function which s a utility value for agent i;

$$U_i(s_1, s_2, \ldots, s_n) = W_i\left\{\binom{m}{2} - d(s_i, p_i)\right\} + \left\{\frac{W_i}{\sum_{l \in N} W_l} \sum_{j,k \in N} WeightedSim(s_j, s_k)\right\}$$

where N is the group 215 of all agents 215a-215d;

where $s_i$ is the round (r−1) strategy of agent i;

where $p_i$ is the initial preferred strategy of agent i identified in step 410 of FIG. 4;

where $d(s_i, p_i)$ is a Distance function that s a degree of dissimilarity between two strategies or preferences $s_i$ and $p_i$; and where $SIM(s_j, s_k)$ is a Similarity function that returns a degree of similarity between two strategies or preferences $s_j$ and $s_k$.

Here, the term $$\binom{m}{2}$$

is standard notation for a number of combinations of m objects taken 2 at a time, where m is the total number of possible responses R, and where the order of objects in each combination does not matter. As is known in the art, this term is equivalent to:

$$\frac{m!}{2(m-2)!}$$

For example, if the set R contains five possible responses, the combination term evaluates to:

$$\frac{5!}{2(5-2)!} = \frac{120}{2(3)!} = \frac{120}{720} = \frac{1}{6}$$

Many distance functions and similarity functions are known in the art, and the present invention is flexible enough to accommodate embodiments that use any known distance or similarity function desired by an implementer.

In one simple example, consider a set of all feasible responses R={R(1), R(2), R(3), R(4)}, where a distance between two strategies is defined as a number of responses of the two strategies that do not match. Thus, if strategy s1 orders the responses (R(1), R(3), R(2), R(4)) and a strategy s2 orders the responses (R(1), R(3), R(4), R(2)), then the distance d(s1,s2) between the two strategies would equal 2 since strategy s1 sequences two responses (R(4) and R(2)) differently than does strategy s1.

In another example, the distance function d(s1,s2) might be defined as a function that returns a percent difference between the strategy sequences s1 and s2. Here, d(s1,s2) would thus return a value of 50% or 0.50, since 50% of the set of feasible responses occupy different positions in sequences specified by s1 and s2.

Many other distance functions are possible, include some that use statistical or higher-dimensional geometric functions to derive "distances" between two ordered sequences. Distance functions may be used to compare agents' initial preferences and negotiated strategies in any combination.

In more advanced embodiments, a strategy may be represented as an n-tuple, a multidimensional array, a single numeric value, an alphanumeric string, a set of natural language phrases that may be interpreted by a natural-language programming application, or by any other type of representation known in the art. Embodiments may comprise multidimensional strategies that contain contingent terms or that comprise nested terms. In all these cases, distance functions known in the art may be selected as desired by an implementer in order to quantize a "distance" between two such strategies or initial preferences.

Similarity functions SIM may be selected by similar means in order to quantize a degree of similarity between a pair of initial preferences or strategies. In some embodiments, a SIM function may be as simple as an inverse function of a Distance function, because the SIM operation identifies how dissimilar two strategies may be and the Distance function identifies how similar two strategies may be.

As with distance functions, many types of similarity functions are known in the art, and the present invention is flexible enough to accommodate any similarity function desired by an implementer.

The Utility function comprises two components: a private utility value (represented by the first term) that is associated with the personal strategy initially selected by agent i and a public utility value (represented by the second term) that identifies the aggregate utility of the strategies selected by the entire group.

The first term of the Utility function returns a value that is a function of the distance (or dissimilarity) between the $i^{th}$ agent's personal preference $p_i$ (the initial sequence of responses identified by the $i^{th}$ agent in step 410 of FIG. 4 as a function of that agent's intrinsic priorities) and the $i^{th}$ agent's round (r−1) strategy $s_i$ (the most recent sequence of responses identified by the $i^{th}$ agent during the previous performance of the method of FIG. 5). Here, a smaller distance means that the agent's current proposed strategy is closer to the agent's preferences and thus has greater private utility to the agent. Because the distance function is a negative term, if the magnitude of the distance between the $i^{th}$ agent's $p_i$ and $s_i$ is smaller, then that agent's private utility is greater. The maximum value of private utility occurs when $p_i$ and $s_i$ are identical, which equates to a distance of zero between the two.

The second term of the Utility function represents the public utility of the round (r−1) strategies of the entire group 215. This term returns the sum of a Similarity between every possible pair of agent strategies identified in round (r−1). If those strategies are very similar, the second term is higher, indicating greater public utility and a state in which the agents are closer to a consensus decision. The maximum value of the second term occurs when the strategies of all agents are identical, resulting in a sum of maximum Similarity values.

At the conclusion of step 515, agent i will have used the Utility function to compute the public utility to agent i of the most recently determined round (r−1) strategies of all agents in the group 215 and the private utility to agent i of agent i's most recently determined round (r−1) strategy.

In step 520, agent i computes a set P of Similarity values that each represent a degree of similarity between agent i's round (r−1) strategy and a round (r−1) strategy (announced in step 505) of another agent in the group 215. For example, if group 215 comprises four agents, then set P would contain three similarity values, each of which identifies a relative degree of similarity between agent i's r−1 strategy and the r−1 strategy of one of the other three agents in group 215.

In step 525, agent i selects a subset P' of set P, where subset P' identifies other agents' round (r−1) strategies that are most similar to agent i's round (r−1) strategy. For example, if agent i is agent 215a of FIG. 2, and the set P={12, 47, 22} identifies in sequence the relative similarities of agent i's round (r−1) strategy to round (r−1) strategies of, respectively, agents 215b, 215c, and 215d, then agent 215c's strategy would be most similar to that of agent 215a/agent i, agent 215d's strategy would be second-most similar, and agent 215b's strategy would be least similar.

Here, any known method may be used to set a threshold condition for selecting strategies that are "most similar." Some embodiments may, for example, deem strategies to be "most similar" if they are associated with a similarity value that exceeds a certain absolute numeric value. Other embodiments may choose a certain absolute number of agents who have selected strategies associated with the highest similarity values or may choose a certain percent of agents that have the highest similarity values. In the running example, if an embodiment is designed to select from set P the two highest similarity values, then the previously defined set P={12, 47, 22} would yield a subset P'={47, 22}, resulting in the selection of round (r−1) strategies of agents 215c and 215d being deemed to be "most similar" to the round (r−1) strategy of agent i.

The present invention is flexible enough to accommodate any method of selecting the most similar strategies, and any total number of most similar strategies to choose in this step. The decision of how many "most similar" strategies to choose and how to select the "most similar" strategies may be made by any means known in the art, including by means of empirical methods that are observed, through actual operation of the present invention, to produce the greatest efficiency, lowest response time, or most desirable consensus decisions.

In step 530, agent i selects a single agent's round (r−1) strategy S(r) from the round (r−1) strategies identified by subset where S(r) is the strategy of subset P' that has the highest utility value, as determined by the Utility function U. This step is performed by comparing results produced by the Utility function for each "most similar" strategy identified by subset P', and then selecting the strategy identified by subset P' that returns the greatest utility value.

In step 535, agent i identifies its final adjusted round (r) strategy. This step is performed by randomly selecting between S(r) and agent i's previous round (r−1) strategy. In other words, agent i in this step either: i) does not change its strategy from agent i's previous round (r−1) strategy; or ii) selects a round (r−1) strategy, previously announced by another agent in step 605, that has the greatest amount of utility among strategies that have been judged to be "most similar" to agent i's initial personal preferences.

Agent i may choose between these two options by any computerized means known in the art that is capable of assigning a 50% probability to selecting strategy S(r) and a 50% probability to choosing agent i's previous round (r−1) strategy.

At the conclusion of step 535, the iterative procedure of steps 510-535 restarts, this time processing the next agent of group 215. When the last agent has been processed, each agent will have identified an adjusted round (r) strategy, and control ill be returned to step 425 of the current iteration of the iterative FIG. 4 procedure of steps 410-440.

FIG. 6 is a flow chart that illustrates a second computational strategy-update procedure for reducing dissimilarities among agent strategies in accordance with embodiments of the present invention. This update procedure is a novel example of a procedure for implementing step 420 of FIG. 4. FIG. 6 comprises steps 605-635.

Like the method of FIG. 5, the method of FIG. 6 updates the decision-making strategies of each agent in a group of agents that are negotiating a consensus response to the request received in step 405 of FIG. 4. Similarly, the description of the method of FIG. 6 arbitrarily assumes, for pedagogical purposes, that this method is performed by an embodiment comprising the real-time multi-agent architecture shown in FIG. 2. However, analogous methods may be used in embodiments based on an architecture similar to that of FIG. 3 or on other architectures or topologies like those described above and in FIGS. 1-3.

As in FIG. 5, here, a group 215 of agents 215a-215d each identify a strategy that ranks possible responses to the request of step 405 in order of preference. Given a set R of m possible responses R={R(1), R(2), . . . , R(m)}, then each agent's strategy is a sequence that orders some or all the m responses in R in that agent's forward or reverse order of preference.

Each performance of FIG. 4 step 420 (which performs the method of FIG. 6) occurs once during a round (r) of the iterative procedure of FIG. 4 steps 415-440. Each performance of step 420 and the method of FIG. 6 adjusts the previous round (r−1) strategies of each agent of group 215 such that the adjusted round (r) strategies more closely approach a common consensus decision. FIG. 4 repeats step 420 and the method of FIG. 6 until the strategies of the agents 215a-215d of group 215 converge to a consensus decision.

At the outset of the method of FIG. 6 each agent 215a-215d of agent group 215 is associated with that agent's previously identified round (r−1) strategy, which consists of a sequence of some or all candidate responses R ordered as a function of that agent's order of preference.

The first time that FIG. 4 step 420 calls the method of FIG. 6, each agent begins performing the method of FIG. 6 by announcing an initial-preferences strategy selected by that agent in FIG. 4 step 410. Each agent's initial strategy is based on that agent's true preferences and priorities specific to that agent. In subsequent performances of FIG. 4 step 420, each agent will begin a current round (r) of the method of FIG. 6 with a strategy selected by that agent in the previous round (r−1) performance of the method of FIG. 6.

If, at any time, the agents' strategies reach a consensus, the method of FIG. 4 ends. A consensus may occur when the agents agree on the same strategy—that is, when the agents all order the set of feasible responses in the same way. The method of FIG. 4 may also end prematurely, without ever calling a method of FIG. 5 or of FIG. 6, if a consensus exists among the agents' initial-preference strategies selected in step 410.

In some embodiments, a consensus may occur if a subset of agents select the same strategy, or if some or all agents select strategies that are sufficiently similar to satisfy a threshold condition. Such a condition might, for example, require that different agents' strategies order a certain number of responses in the same relative order or that a those strategies associate a same or similar subset of the set of feasible strategies with a higher-position priority.

In step 605, each agent of group 215 announces its previous round (r−1) strategy to other agents of group 215. If the agents have previously shared their round (r−1) strategies in a previous performance of the method of FIG. 6 or in a step of the method of FIG. 4, this step may be omitted.

Step 610 begins an iterative procedure of steps 610-635. Each iteration of this procedure identifies steps to be taken by one particular agent 215a-215d of group 215 to update that agent's "r−1" strategy, selected during the most recent round (r−1) (and the most recent performance of the method of FIG. 6), to a new round (r) strategy. As described above, this updating is performed by adjusting the agent's most recent round (r−1) preferential order of responses to an adjusted "round (r)" preferential order of responses.

At the conclusion of the final iteration of the iterative procedure of steps 610-635, each agent of group 215 will have updated its previous-round (r−1) agent-specific strategy to a new round (r) strategy, and the strategy-update procedure of round (r) will have completed. Control will then return to step 425 of the "round (r)" iteration of the iterative procedure of FIG. 4 steps 415-440, which will determine whether the updated strategies now constitute a consensus.

In step 615, an "$i^{th}$" agent of group 215 begins round (r) of a procedure to update agent i's previous round (r−1) strategy to a new round (r) strategy. In this step, agent i performs a set of utility computations that derive a "utility" value of each combination of agent i's strategy with the strategies of another agent of group 215. This utility may be derived by means of Utility function $U_i$ and the Utility function's component Distance d( ) and Similarity SIM( ) functions (all described in detail in FIG. 5).

At the conclusion of step 615, agent i will have used the Utility function to compute the public utility to agent i of the most recently determined round (r−1) strategies of all agents in the group 215 and the private utility to agent i of agent i's most recently determined round (r–1) strategy.

In step 620, agent i computes a set Q of utility values for each round (r–1) strategy announced by another agent in step 605. For example, if group 215 comprises four agents, then set Q would contain three utilities values, each of which identifies a relative degree of utility for a round (r–1) strategy of one of the other three agents in group 215.

In step 625, agent i selects a subset Q' of set Q, where subset Q' identifies other agents' round (r–1) strategies that have greater utility than the utility (computed in step 615) of agent i's round (r–1) strategy.

In step 630, agent i selects a single agent's round (r–1) strategy S(r) from the strategies identified by subset Q', where S(r) is the strategy identified by Q' that has the greatest degree of similarity to agent i's round (r–1) strategy. This step is performed by comparing similarity values returned by the SIM( ) function for each strategy identified by subset Q', and then selecting the strategy identified by subset Q' that has the greatest degree of similarity to the strategy previously selected by agent i in round (r–1).

In step 635, agent i identifies its final adjusted round (r) strategy. This step is performed by randomly selecting between S(r) and agent i's previous round (r–1) strategy. In other words, agent i in this step either: i) does not change its strategy from agent i's previous round (r–1) strategy; or selects a round (r–1) strategy, previously announced by another agent in step 605, that, among strategies that have greater utility than agent i's round (r–1) strategy, is most similar to agent i's round (r–1) strategy.

Agent i may choose between these two options by any computerized means known in the art that is capable of assigning a 50% probability to selecting strategy S(r) and a 50% probability to choosing agent is previous round (r–1) strategy.

At the conclusion of step 635, the iterative procedure of steps 610-635 restarts, this time processing the next agent of group 215. When the last agent has been processed, each agent will have identified an adjusted round (r) strategy, and control will be returned to step 425 of the current iteration of the iterative FIG. 4 procedure of steps 410-440.

As described above, and as in the examples of FIGS. 2 and 3, agent groups 215, 315, and 320 may use the methods of FIGS. 4-6 to determine which response, of a set of candidate feasible responses, should be returned to system 310 by means of a consensus decision-making method. These methods comprise steps in which agents of group 215, or agents of group 315 and agents of group 320, each iteratively negotiate with other agents of their respective groups the content of the returned response until a consensus decision is reached.

In some embodiments, many agent groups similar to 315 and 320 may perform these and similar methods of arriving at a consensus decision. Each such group may comprise any number of agents deemed appropriate by an implementer. In some cases, all agents (or a subset of the total set of agents comprised by all groups) may be involved identifying the consensus decision. In other cases, each group may identify its own decision, based on a consensus of the agents in that group, and then a final consensus decision may be identified, based on a consensus among the groups themselves. Many other combinations and nested levels of consensus decision-making may be accommodated by embodiments of the present invention, but in all cases, each consensus operation may be defined by the iterative methods and examples of FIG. 4.

When an embodiment comprises only one agent group, as illustrated in FIG. 2, which comprises only one group 215, agents of that group 215 arrive at a consensus by means of the method of FIG. 4. But an embodiment that comprises multiple groups of agents, a consensus decision may be achieved by nested iterations of FIG. 4.

For example, in an embodiment that comprises four groups of agent, G1, G2, G3, and G4, each of the four groups may use the method of FIG. 4 to arrive at a distinct group-specific consensus. The system may then use upper-level iterations of the method of FIG. 4 to arrive at a final consensus response by reconciling the group-specific decisions. In other words, during each upper-level iteration of the method of FIG. 4, each group would update its group-specific decision by means of a full set of iterations of the method of FIG. 4.

Embodiments of the present invention may comprise other ways of organizing agents when using methods of FIG. 4 to arrive at a final response. For example, groups may be organized into more than two levels of negotiating groups, requiting more than two nested levels of the iterative procedure of FIG. 4. In another example, all agents in all groups may be aggregated such that one level of the method of FIG. 4, as described above, is used to concurrently reconcile the preferences of all agents in all groups. In embodiments that comprise a larger number of groups or agents, the agents may be grouped, nested, or organized in any manner deemed sufficiently efficient, fast, or accurate by an implementer, regardless of how many nested levels of the method of FIG. 4 are required by the grouping, nesting, or organizing. The present invention is flexible enough to accommodate these and any similar types of groupings, nestings, and organizations of agents and groups, as desired by an implementer practicing the present invention.

Finally, embodiments and examples of the present invention described in this document may be extended by assigning weights to each agent's strategy. This feature allows certain agents to be deemed to have greater importance, or to have greater importance when responding to certain types of requests for response.

This weighting may be performed by using any means known in the art to adjust the Utility, Distance, and Similarity functions described above. One example of such an adjustment is to associate each agent i with a weighting factor $W_i$ and to modify the Utility function by using these weighting factors to weight each agent's contribution to total utility. In some embodiments, the Similarity function may also be modified in a similar manner to a Weighted Similarity function WeightedSim( ). Such a Weighted Similarity function might, for example, differ from the unweighted SIM( ) function by multiplying a value of a similarity between two agents i and j by a similarity-weighting factor, where the similarity-weighting factor is a function of a product, sum, or other combination of $W_i$ and $W_j$.

Many ways of adding weighting to equations like the Utility function are known in the art and the present invention is flexible enough to accommodate any weighting method preferred by an implementer. One example of such an adjusted. Utility function might be expressed as:

$$U_i(s_1, s_2, \ldots, s_n) = W_i \left\{ \binom{m}{2} - d(s_i, p_i) \right\} + \left\{ \frac{W_i}{\sum_{l \in N} W_l} \sum_{j,k \in N} \text{WeightedSim}(s_j, s_k) \right\}$$

What is claimed is:

1. A real-time multi-agent system comprising a processor, a memory coupled to the processor, and a computer-readable hardware storage device coupled to the processor, the storage device containing program code configured to be run by the processor via the memory to implement a method for real-time multi-agent response based on a preference-based consensus, the method comprising:

the system receiving from a real-time application a request for a real-time response to a detected condition, where the requested response is selected by the system from a set of feasible responses;

the system forwarding the request to a set of computerized agents;

the system further receiving an initial preference from each agent,
where each agent's initial preference identifies an initial ordering of the set of feasible responses, and
where each agent's initial ordering ranks the set of feasible responses as a function of that agent's relative degree of preference for each response of the set of feasible responses;

the system identifying a consensus response of the set of feasible responses by iteratively reconciling the agents' initial orderings,
where each iteration of the reconciling attempts to reduce differences among the agents' initial orderings by:
the system identifying whether the agents' initial preferences are in agreement;
the system, whenever identifying that the agents' initial preferences are not in agreement:
the system directing each agent of the set of computerized agents to update its current preference as a function of the preferences most recently received by the system from other agents of the set of computerized agents,
where the directing a first agent of the set of computerized agents to update the first agent's current preference comprises associating the first agent's current preference with a utility value that comprises a private utility component and a public utility component,
where the utility value associated with the first agent is proportional to:
a total number of agents in the set of computerized agents,
a value of a Distance function that returns a degree of dissimilarity between the first agent's initial preference and the first agent's current preference,
values of a Similarity function that returns a degree of similarity between current preferences of each pair of agents of the set of computerized agents, and
a number of combinations of all possible orderings of the set of feasible responses, taken two at a time,
where the private utility component identifies a relative value to the first agent of the current preference of the first agent, and
where the public utility component identifies a relative value to the first agent of the current preferences of other agents of the set of computerized agents;

the system receiving from each agent of the set of computerized agents that agent's updated preference;

the system repeating the directing and the receiving the updated preferences until the system identifies that the set of computerized agents are in agreement; and the system selecting the consensus response to be a response of the set of feasible responses that is that is associated, by the agents' most recently updated preferences, with a highest relative degree of preference; and the system returning a real-time response to the real-time application that identifies the consensus response.

2. The system of claim 1, where the reconciling further comprises:
the system, if identifying that the agents' initial preferences are in agreement, selecting the consensus response to be a response of the set of feasible responses that is associated, by the agents' initial preferences, with a highest relative degree of preference.

3. The system of claim 1, where the system directs a first agent to update its current preference by directing the first agent to:
announce the first agent's current preferences to other agents of the set of computerized agents;
compute a set of similarity values, where each similarity value of the set of similarity values is proportional to a degree of similarity between the first agent's initial preference and a current preference of another agent of the set of computerized agents;
select a subset of current preferences of other agents of the set of computerized agents, where the preferences comprised by the subset are each associated with a similarity value of the set of similarity values that exceeds a minimum threshold similarity value;
compute a set of utility values that each identifies a relative usefulness to the first agent of a preference of the subset of the current preferences;
select a most-useful preference of the subset of current preferences, where the most-useful preference is associated with a highest utility value associated with any preference of the subset of current preferences; and
update the first agent's current preference, by means of a random choice, to either become the most-useful preference or to remain unchanged.

4. The system of claim 1, where the system directs a first agent to update its current preference by directing the first agent to:
announce the first agent's current preferences to other agents of the set of computerized agents;
compute a set of utility values that each identifies a relative usefulness to the first agent of a current preference of an agent of the set of computerized agents;
compute a set of similarity values, where each similarity value of the set of similarity values is proportional to a degree of similarity between the first agent's initial preference and a current preference of another agent of the set of computerized agents;
select a subset of current preferences of other agents of the set of computerized agents, where the preferences comprised by the subset are each associated with a utility value of the set of utility values that exceeds a utility value, of the set of utility values, that is associated with the first agent;

select a most-similar preference of the subset of current preferences, where the most-similar preference is associated with a highest similarity value associated with any preference of the subset of current preferences; and
update the first agent's current preference, by means of a random choice, to either become the most-similar preference or to remain unchanged.

5. The system of claim 1,
where the system directing a first agent to update its current preference comprises associating the first agent's current preference with a set of similarity values,
where each similarity value of the set of similarity values is proportional to a degree of similarity between the first agent's initial preference and the current preference of another agent of the set of computerized agents, and
where a degree of similarity between two preferences is deemed to be greater when the two preferences order a greater number of feasible responses in a similar manner.

6. The system of claim 1,
where the real-time application comprises an Internet-of-Things controller that receives real-time information from a computerized Internet-of-Things device, and
where the computerized Internet-of-Things device requires from the system a real-time response to the received real-time information.

7. The system of claim 1,
where the real-time application comprises a vehicle controller that receives real-time information from a self-driving vehicle, and
where the self-driving vehicle requires from the system a real-time response to the received real-time information.

8. The system of claim 1,
where the system identifies the consensus response to be a response that is most preferred by the agents when the set of computerized agents reach agreement, and
where the set of computerized agents are deemed to have reached agreement when:
a subset, of the set of computerized agents, are each associated with a corresponding set of agent preferences,
where each of the corresponding sets consists of preferences that, when applied to a first subset of the feasible responses, ranks the first subset in an identical order,
where a number of agents in the subset of the set of computerized agents exceeds a first predetermined threshold value, and
where a number of responses in the first subset exceeds a second predetermined threshold value.

9. A method for real-time multi-agent response based on a preference-based consensus, the method comprising:
a real-time multi-agent system receiving from a real-time application a request for a real-time response to a detected condition, where the requested response is selected by the system from a set of feasible responses;
the system forwarding the request to a set of computerized agents;
the system further receiving an initial preference from each agent,
where each agent's initial preference identifies an initial ordering of the set of feasible responses, and
where each agent's initial ordering ranks the set of feasible responses as a function of that agent's relative degree of preference for each response of the set of feasible responses;
the system identifying a consensus response of the set of feasible responses by iteratively reconciling the agents' initial orderings,
where each iteration of the reconciling attempts to reduce differences among the agents' initial orderings by:
the system identifying whether the agents' initial preferences are in agreement
the system, whenever identifying that the agents' initial preferences are not in agreement:
the system directing each agent of the set of computerized agents to update its current preference as a function of the preferences most recently received by the system from other agents of the set of computerized agents,
where the directing a first agent of the set of computerized agents to update the first agent's current preference comprises associating the first agent's current preference with a utility value that comprises a private utility component and a public utility component,
where the utility value associated with the first agent is proportional to:
a total number of agents in the set of computerized agents,
a value of a Distance function that returns a degree of dissimilarity between the first agent's initial preference and the first agent's current preference,
values of a Similarity function that returns a degree of similarity between current preferences of each pair of agents of the set of computerized agents, and
a number of combinations of all possible orderings of the set of feasible responses, taken two at a time,
where the private utility component identifies a relative value to the first agent of the current preference of the first agent, and
where the public utility component identifies a relative value to the first agent of the current preferences of other agents of the set of computerized agents;
the system receiving from each agent of the set of computerized agents that agent's updated preference;
the system repeating the directing and the receiving the updated preferences until the system identifies that the set of computerized agents are in agreement and
the system selecting the consensus response to be a response of the set of feasible responses that is that is associated, by the agents' most recently updated preferences, with a highest relative degree of preference; and
the system returning a real-time response to the real-time application that identifies the consensus response.

10. The method of claim 9, where the reconciling further comprises:
the system, if identifying that the agents' initial preferences are in agreement, selecting the consensus response to be a response of the set of feasible responses that is associated, by the agents' initial preferences, with a highest relative degree of preference.

11. The method of claim 9, where the system directs a first agent to update its current preference by directing the first agent to:
announce the first agent's current preferences to other agents of the set of computerized agents;
compute a set of similarity values,
where each similarity value of the set of similarity values is proportional to a degree of similarity between the first agent's initial preference and a current preference of another agent of the set of computerized agents, and
where a degree of similarity between two preferences is deemed to be greater when the two preferences order a greater number of feasible responses in a similar manner;
select a subset of current preferences of other agents of the set of computerized agents, where the preferences comprised by the subset are each associated with a similarity value of the set of similarity values that exceeds a minimum threshold similarity value;
compute a set of the utility values;
select a most-useful preference of the subset of current preferences, where the most-useful preference is associated with a highest utility value associated with any preference of the subset of current preferences; and
update the first agent's current preference, by means of a random choice, to either become the most-useful preference or to remain unchanged.

12. The method of claim 9, where the system directs a first agent to update its current preference by directing the first agent to:
announce the first agent's current preferences to other agents of the set of computerized agents;
compute a set of the utility values;
compute a set of similarity values,
where each similarity value of the set of similarity values is proportional to a degree of similarity between the first agent's initial preference and a current preference of another agent of the set of computerized agents, and
where a degree of similarity between two preferences is deemed to be greater when the two preferences order a greater number of feasible responses in a similar manner;
select a subset of current preferences of other agents of the set of computerized agents, where the preferences comprised by the subset are each associated with a utility value of the set of utility values that exceeds a utility value, of the set of utility values, that is associated with the first agent;
select a most-similar preference of the subset of current preferences, where the most-similar preference is associated with a highest similarity value associated with any preference of the subset of current preferences; and
update the first agent's current preference, by means of a random choice, to either become the most-similar preference or to remain unchanged.

13. The method of claim 9,
where the real-time application comprises an Internet-of-Things controller that receives real-time information from a computerized Internet-of-Things device, and
where the computerized Internet-of-Things device requires from the system a real-time response to the received real-time information.

14. The method of claim 9,
where the real-time application comprises a vehicle controller that receives real-time information from a self-driving vehicle, and
where the self-driving vehicle requires from the system a real-time response to the received real-time information.

15. The method of claim 9, further comprising providing at least one support service for at least one of creating, integrating, hosting, maintaining, and deploying computer-readable program code in the computer system, wherein the computer-readable program code in combination with the computer system is configured to implement the receiving a request, the forwarding, the further receiving, the identifying a consensus response, the receiving each agent's updated preference, the repeating, the selecting, and the returning.

16. A computer program product, comprising a first non-transitory computer-readable hardware storage device having a computer-readable program code stored therein, the program code configured to be executed by a real-time multi-agent system comprising a processor, a memory coupled to the processor, and a second non-transitory computer-readable hardware storage device coupled to the processor, the second non-transitory storage device containing program code configured to be run by the processor via the memory to implement a method for real-time multi-agent response based on a preference-based consensus, the method comprising:
the real-time multi-agent system receiving from a real-time application a request for a real-time response to a detected condition, where the requested response is selected by the system from a set of feasible responses;
the system forwarding the request to a set of computerized agents;
the system further receiving an initial preference from each agent,
where each agent's initial preference identifies an initial ordering of the set of feasible responses, and
where each agent's initial ordering ranks the set of feasible responses as a function of that agent's relative degree of preference for each response of the set of feasible responses;
the system identifying a consensus response of the set of feasible responses by iteratively reconciling the agents' initial orderings,
where each iteration of the reconciling attempts to reduce differences among the agents' initial orderings by:
the system identifying whether the agents' initial preferences are in agreement;
the system, whenever identifying that the agents' initial preferences are not in agreement:
the system directing each agent of the set of computerized agents to update its current preference as a function of the preferences most recently received by the system from other agents of the set of computerized agents,
where the directing a first agent of the set of computerized agents to update the first agent's current preference comprises associating the first agent's current preference with a utility value that comprises a private utility component and a public utility component,
where the utility value associated with the first agent is proportional to:
a total number of agents in the set of computerized agents, a value of a Distance function that returns a degree of dissimilarity between the first agent's initial preference and the first agent's current preference, values of a Similarity function that returns a degree of similarity between current preferences of each pair of agents of the set of computerized agents, and a number of combinations of all possible orderings of the set of feasible responses, taken two at a time, where the private utility component identifies a relative value to the first agent of the current preference of the first agent, and where the public utility component identifies a relative value to the first agent of the current preferences of other agents of the set of computerized agents;

the system receiving from each agent of the set of computerized agents that agent's updated preference;

the system repeating the directing and the receiving the updated preferences until the system identifies that the set of computerized agents are in agreement and the system selecting the consensus response to be a response of the set of feasible responses that is that is associated, by the agents' most recently updated preferences, with a highest relative degree of preference; and the system returning a real-time response to the real-time application that identifies the consensus response.

17. The computer program product of claim 16, where the reconciling further comprises:

the system, if identifying that the agents' initial preferences are in agreement, selecting the consensus response to be a response of the set of feasible responses that is associated, by the agents' initial preferences, with a highest relative degree of preference.

18. The computer program product of claim 16, where the system directs a first agent to update its current preference by directing the first agent to:

announce the first agent's current preferences to other agents of the set of computerized agents;

compute a set of similarity values, where each similarity value of the set of similarity values is proportional to a degree of similarity between the first agent's initial preference and a current preference of another agent of the set of computerized agents, and where a degree of similarity between two preferences is deemed to be greater when the two preferences order a greater number of feasible responses in a similar manner;

select a subset of current preferences of other agents of the set of computerized agents, where the preferences comprised by the subset are each associated with a similarity value of the set of similarity values that exceeds a minimum threshold similarity value;

compute a set of the utility values;

select a most-useful preference of the subset of current preferences, where the most-useful preference is associated with a highest utility value associated with any preference of the subset of current preferences; and update the first agent's current preference, by means of a random choice, to either become the most-useful preference or to remain unchanged.

19. The computer program product of claim 16, where the system directs a first agent to update its current preference by directing the first agent to:

announce the first agent's current preferences to other agents of the set of computerized agents;

compute a set of the utility values;

compute a set of similarity values, where each similarity value of the set of similarity values is proportional to a degree of similarity between the first agent's initial preference and a current preference of another agent of the set of computerized agents, and where a degree of similarity between two preferences is deemed to be greater when the two preferences order a greater number of feasible responses in a similar manner;

select a subset of current preferences of other agents of the set of computerized agents, where the preferences comprised by the subset are each associated with a utility value of the set of utility values that exceeds a utility value, of the set of utility values, that is associated with the first agent;

select a most-similar preference of the subset of current preferences, where the most-similar preference is associated with a highest similarity value associated with any preference of the subset of current preferences; and update the first agent's current preference, by means of a random choice, to either become the most-similar preference or to remain unchanged.

20. The computer program product of claim 16, where the real-time application comprises an Internet-of-Things controller that receives real-time information from a computerized Internet-of-Things device, and where the computerized Internet-of-Things device requires from the system a real-time response to the received real-time information.

21. The computer program product of claim 16, where the real-time application comprises a vehicle controller that receives real-time information from a self-driving vehicle, and where the self-driving vehicle requires from the system a real-time response to the received real-time information.

* * * * *